United States Patent
Song et al.

(10) Patent No.: US 7,609,609 B2
(45) Date of Patent: Oct. 27, 2009

(54) APPARATUS AND METHOD FOR PROCESSING DIGITAL SIGNAL IN AN OFDMA WIRELESS COMMUNICATION SYSTEM

(75) Inventors: Seong-Wook Song, Gwacheon-si (KR); Yong-Chul Song, Seoul (KR); Young-Mo Gu, Suwon-si (KR); Min-Goo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 11/274,900

(22) Filed: Nov. 16, 2005

(65) Prior Publication Data
US 2006/0120266 A1    Jun. 8, 2006

(30) Foreign Application Priority Data
Nov. 16, 2004    (KR)    ...................... 10-2004-0093519

(51) Int. Cl.
*H04J 9/00*    (2006.01)
(52) U.S. Cl. .................. 370/203; 370/252; 370/319; 370/344
(58) Field of Classification Search .................. 370/203, 370/204, 210, 252, 413; 375/260, 324, 316
See application file for complete search history.

(56) References Cited

U.S. PATENT DOCUMENTS

| | | | | |
|---|---|---|---|---|
| 5,787,123 A | * | 7/1998 | Okada et al. | 375/324 |
| 5,854,758 A | * | 12/1998 | Kosuda et al. | 708/404 |
| 5,999,573 A | * | 12/1999 | Zangi | 375/316 |
| 6,985,432 B1 | * | 1/2006 | Hadad | 370/203 |
| 2004/0105454 A1 | * | 6/2004 | Okamura | 370/413 |
| 2004/0252776 A1 | * | 12/2004 | Balakrishnan et al. | 375/260 |
| 2006/0098752 A1 | * | 5/2006 | Song et al. | 375/260 |
| 2006/0176968 A1 | * | 8/2006 | Keaney et al. | 375/260 |

FOREIGN PATENT DOCUMENTS

| | | |
|---|---|---|
| RU | 2 101 870 C1 | 1/1998 |
| RU | 2 108 666 C1 | 4/1998 |
| RU | 2 142 199 C1 | 11/1999 |

OTHER PUBLICATIONS

Masayuki Nakanishi et al., "Reduction Of FFT Circuit Area For OFDM Demodulator Based On Skipping-Point Representation", 2004 IEEE Asia- Pacific Conference on Advanced System Integrated Circuits, Aug. 4-5, 2004, pp. 430-431.

* cited by examiner

*Primary Examiner*—Ricky Ngo
*Assistant Examiner*—David Oveissi
(74) *Attorney, Agent, or Firm*—Roylance, Abrams, Berdo and Goodman, LLP

(57) ABSTRACT

An apparatus and method is provided to process a digital signal in an orthogonal frequency division multiple access (OFDMA) wireless communication system. In the apparatus, a memory stores the number of subcarriers allocated to a mobile terminal and stores an inverse discrete Fourier transform (IDFT) coefficient. A controller outputs a mode selection signal indicating a transmission mode or a reception mode. An inverse fast Fourier transform (IFFT) block multiplies a first result obtained by determining a bitwidth for the IDFT coefficient according to the number of subcarriers by a second result obtained by determining a bitwidth for data according to the number of subcarriers.

15 Claims, 6 Drawing Sheets

APPARATUS AND METHOD FOR PROCESSING DIGITAL SIGNAL IN AN OFDMA WIRELESS COMMUNICATION SYSTEM

CROSS-REFERENCE TO RELATED APPLICATIONS

This application claims the benefit under 35 U.S.C. §119(a) of Korean Patent Application No. 10-2004-0093519 entitled "Terminal and Method for Performing a Inverse Fast Fourier Transform according to Sub-Carrier Number in Orthogonal Frequency Division Multiplexing System" filed in the Korean Intellectual Property Office on Nov. 16, 2004, the entire disclosure of which is hereby incorporated by reference.

BACKGROUND OF THE INVENTION

1. Field of the Invention

The present invention relates generally to a wireless communication system. In particular, the present invention relates to an apparatus and method for processing digital signals in an Orthogonal Frequency Division Multiple Access (OFDMA) wireless communication system.

2. Description of the Related Art

A mobile communication system using cellular communication technology is the typical wireless communication system. Such a mobile communication system uses multiple access schemes in order to simultaneously communicate with a plurality of users. The multiple access schemes are classified as a Time Division Multiple Access (TDMA) scheme, a Code Division Multiple Access (CDMA) scheme, and a Frequency Division Multiple Access (FDMA) scheme. A communication system using the CDMA scheme, with the rapid progress of the CDMA technology, has developed from the early communication system mainly providing voice service, into an advanced communication system that is capable of transmitting high-speed packet data. However, in order to overcome the limited use of code sources in the CDMA scheme, an Orthogonal Frequency Division Multiple Access (OFDMA) scheme has been proposed.

An Orthogonal Frequency Division Multiplexing (OFDM) scheme is a scheme for transmitting data using multiple carriers, and is a kind of Multi-Carrier Modulation (MCM) scheme that parallel-converts a serial input symbol stream into parallel symbols and modulates the individual parallel symbols with a plurality of orthogonal subcarriers, that is, a plurality of orthogonal subcarrier channels, before transmission.

The MCM scheme was first applied to a military high-fidelity (HF) radio in the late 1950s. The OFDM scheme that overlaps a plurality of orthogonal subcarriers has developed since the 1970s, but has limitations in being applied to an actual system because of its difficulty in implementing orthogonal modulation between the multiple carriers. However, the rapid development of the OFDM scheme was triggered as Weinstein et al. announced in 1971 that OFDM-based modulation/demodulation could be efficiently processed using discrete Fourier transform (DFT). For reference, DFT transforms a time-domain signal into a frequency-domain signal, whereas inverse discrete Fourier transform (IDFT), an inverse process of DFT, transforms a frequency-domain signal into a time-domain signal. In addition, the possible use of a guard interval and the possible insertion of a cyclic prefix (CP) into the guard interval have reduced the defects of the system caused by multipath propagation and delay spread.

Owing to the development of the OFDM technology, the OFDM scheme is now widely being applied to such digital transmission technologies as digital audio broadcasting (DAB), digital television (DTV), wireless local area network (WLAN) and wireless asynchronous transfer mode (WATM). That is, the OFDM scheme, which was not widely used due to its hardware complexity, can now be implemented owing to the recent development of various digital signal processing technologies including fast Fourier transform (FFT) and inverse fast Fourier transform (IFFT). The OFDM scheme, being similar to the conventional frequency division multiplexing (FDM) scheme, is characterized by transmitting a plurality of subcarriers while maintaining orthogonality therebetween, thereby obtaining the optimal transmission efficiency during high-speed data transmission. In addition, the OFDM scheme has high frequency efficiency and is robust against multipath fading, so it can obtain the optimal transmission efficiency during high-speed data transmission. Moreover, because the OFDM scheme overlaps frequency spectrums, it has high frequency efficiency, is robust against frequency selective fading and multipath fading, can reduce inter-symbol interference (ISI) with the use of a guard interval, can enable simple hardware design of an equalizer, and is robust against impulse noises. Therefore, the OFDM scheme is now widely being applied to the communication system.

In the OFDMA communication system, a transmitter of a terminal performs IDFT on M-ary symbols, inserts a CP with an appropriate length into the IDFT-processed symbols, and delivers the CP-inserted symbols to its radio frequency (RF) stage. Generally, the transmitter uses IFFT to efficiently perform IDFT. A receiver removes a CP from a received signal and performs FFT on the CP-removed signal to offset the IFFT effect obtained during transmission.

In the commercial system, a fixed point algorithm is generally implemented instead of a floating point algorithm in order to reduce the production cost. Even in the IFFT or FFT process, the system generally performs IFFT or FFT using the fixed point algorithm. The fixed point algorithm expresses a signal with a particular number of data bits. In the process of performing quantization using the fixed point algorithm, a signal is expressed with a number of bits after its values following a particular digit below the decimal point are deleted, causing a quantization error.

Generally, when a quantization error is relatively lower than additive noise allowed in the system, the number of data bits is determined according to a signal-to-quantization noise ratio (SQNR) required by the system, because the full algorithm performance is less affected by the quantization error. That is, the actually implemented hardware allocates a number of data bits taking the SQNR required in the system into consideration, thereby implementing all data with the fixed point. For example, an OFDMA system using 1024 subcarriers uses 13 data bits for 40dB SQNR.

In the OFDMA system, subcarriers allocated to a terminal are subject to change, and a data bitwidth required for maintaining a constant SQNR due to the change in the allocated subcarriers is also subject to change. Accordingly, there is an increasing need for a system and method for varying the number of data bits according to the number of subcarriers allocated to the terminal during IFFT.

SUMMARY OF THE INVENTION

It is, therefore, an object of the present invention to substantially solve the above and other problems and provide a digital signal processing apparatus and method for varying the number of data bits used during IFFT at a transmitter of a terminal according to the number of subcarriers allocated to the terminal.

It is another object of the present invention to provide a digital signal processing apparatus and method for implementing IFFT used for a transmitter with lower power in an OFDMA wireless communication system.

According to one aspect of the present invention, an apparatus is provided for processing a digital signal in an orthogonal frequency division multiple access (OFDMA) wireless communication system. The apparatus comprises a memory for storing the number of subcarriers allocated to a mobile terminal and storing an inverse discrete Fourier transform (IDFT) coefficient, a controller for outputting a mode selection signal indicating a transmission mode or a reception mode, and an inverse fast Fourier transform (IFFT) block for multiplying a first result obtained by determining a bitwidth for the IDFT coefficient according to the number of subcarriers by a second result obtained by determining a bitwidth for data according to the number of subcarriers.

According to another aspect of the present invention, an apparatus is provided for processing a digital signal in an orthogonal frequency division multiple access (OFDMA) wireless communication system. The apparatus comprises a memory for storing the number of subcarriers allocated to a mobile terminal and storing an inverse discrete Fourier transform (IDFT) coefficient, a controller for outputting a mode selection signal indicating a transmission mode or a reception mode, a first bitwidth adjuster for, upon receiving transmission data, determining a bitwidth for the data according to the number of allocated subcarriers, a second bitwidth adjuster for determining a bitwidth for an IDFT coefficient according to the number of allocated subcarriers, and a multiplier for performing multiplication calculations on the data and the IDFT coefficient output from the first and second bitwidth adjusters.

According to another aspect of the present invention, a method is provided for processing a digital signal in an orthogonal frequency division multiple access (OFDMA) wireless communication system. The method comprises the steps of checking the number of subcarriers allocated to a mobile terminal, determining a bitwidth for an inverse discrete Fourier transform (IDFT) coefficient according to the number of allocated subcarriers, determining a bitwidth for data according to the number of allocated subcarriers, and performing multiplication calculations on the IDFT coefficient and the data.

BRIEF DESCRIPTION OF THE DRAWINGS

The above and other objects, features and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
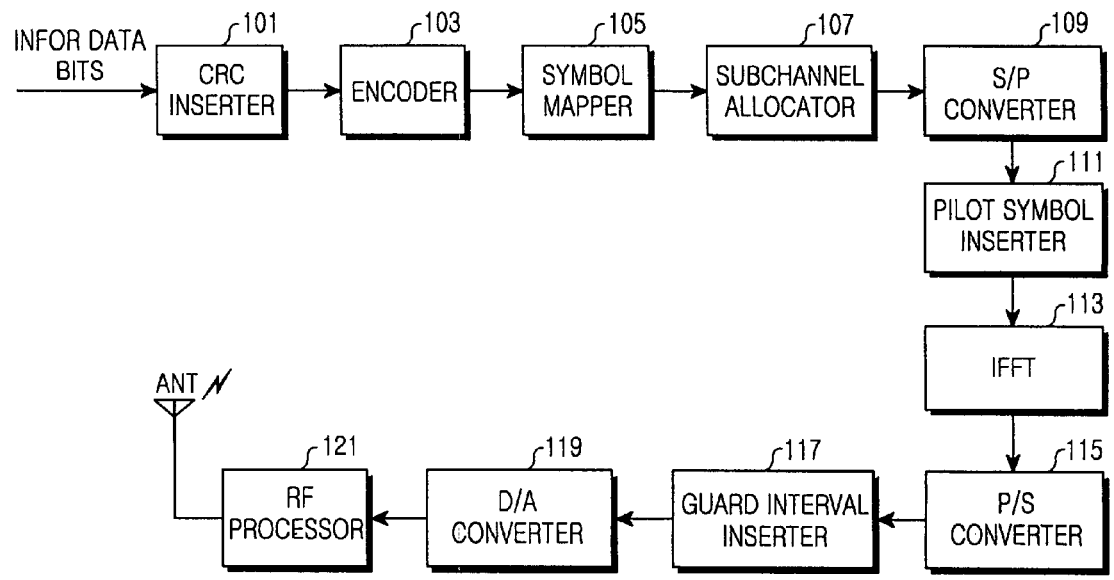
FIG. 1 is a block diagram illustrating an exemplary structure of a transmitter for an OFDMA system to which an embodiment of the present invention is applied.

Exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Embodiments of the present invention allow a transmitter of a terminal to perform IFFT using a number of bits required for subcarriers allocated to the terminal, thereby performing IFFT with optimized calculations.

With reference to FIG. 1, a description will now be made of an exemplary transmitter of a terminal for performing IFFT.

FIG. 1 is a block diagram illustrating a structure of a transmitter for an OFDMA system to which an embodiment of the present invention is applied. The transmitter of FIG. 1 comprises a cyclic redundancy check (CRC) inserter 101, an encoder 103, a symbol mapper 105, a subchannel allocator 107, a serial-to-parallel (S/P) converter 109, a pilot symbol inserter 111, an IFFT block 113, a parallel-to-serial (P/S) converter 115, a guard interval inserter 117, a digital-to-analog (D/A) converter 119, and a radio frequency (RF) processor 121.

Referring to FIG. 1, user data bits or control data bits (hereinafter referred to as "information data bits") to be transmitted are input to the CRC inserter 101. The CRC inserter 101 inserts CRC bits to the input information data bits and outputs the CRC-added information data bits to the encoder 103. The encoder 103 encodes an output signal of the CRC inserter 101 with a predetermined coding scheme and outputs the coded signal to the symbol mapper 105. Herein, the coding scheme may comprise a turbo coding scheme or a convolutional coding scheme having a predetermined code rate.

The symbol mapper 105 modulates coded bits output from the encoder 103 into modulation symbols with a predetermined modulation scheme, and outputs the modulation symbols to the subchannel allocator 107. Herein, the modulation scheme may comprise Quadrature Phase Shift Keying (QPSK) or 16-ary Quadrature Amplitude Modulation (16 QAM), both of which are well known to those skilled in the art, but is not limited thereto. The subchannel allocator 107 allocates subchannels the modulation symbols output from the symbol mapper 105, and outputs the subchannel-allocated modulation symbols to the S/P converter 109.

The S/P converter 109 converts the serial modulation symbols, to which subchannels and subbands are allocated, output from the subchannel allocator 107, into parallel modulation symbols, and outputs the parallel modulation symbols to the pilot symbol inserter 111. Herein, the S/P converter 109 converts the serial modulation symbols into parallel modulation symbols in order to allow the IFFT block 113 to perform IFFT. The pilot symbol inserter 111 inserts pilot symbols into the parallel modulation symbols output from the S/P converter 109, and outputs the pilot symbol-inserted modulation symbols to the IFFT block 113.

The IFFT block 113 performs N-point IFFT on the output signal of the pilot symbol inserter 111, and outputs the IFFT-processed signal to the P/S converter 115. Herein, an operation of the IFFT block 113 is performed according to an adaptive bitwidth IFFT scheme proposed in an exemplary embodiment of the present invention, and a description thereof will be provided in greater detail below.

The P/S converter 115 converts the output signal of the IFFT block 113 into a serial signal, and outputs the serial signal to the guard interval inserter 117. The guard interval inserter 117 inserts a predetermined guard interval signal into the output signal of the P/S converter 115, and outputs the guard interval-inserted signal to the D/A converter 119. The guard interval signal is inserted to cancel interference between a previous OFDM symbol transmitted at a previous OFDM symbol time and a current ODM symbol transmitted at the current OFDM symbol time in the OFDMA communication system.

The D/A converter 119 converts the output signal of the guard interval inserter 117 into an analog signal, and outputs the analog signal to the RF processor 121. The RF processor 121, comprising a filter and a front-end unit, RF-processes the output signal of the D/A converter 119 such that it can be transmitted over the air, and transmits the RF-processed signal via a transmission antenna ANT.

If, for example, the number of subcarriers allocated to a terminal in the OFDMA system is N, an IDFT signal x[n] of an input signal s(k) to the IFFT block 113 is given by Equation (1) below.

$$x[n] = \sum_{k=0}^{N-1} s(k)e^{j2\pi/Nkn} \le \sum_{k=0}^{N-1} |s(k)||e^{j2\pi/Nkn}| \qquad (1)$$
$$= \sum_{k=0}^{N-1} s(k) \le N\max|s(k)|$$

It can be noted herein that x[n] is obtained by adding N s(k)e(...) because indexes indicating the sum include 0~N−1, causing a noticeable increase in variation of a signal level. Generally, the increase in variation of a signal level requires an increase in number of data bits in order to satisfy a signal-to-quantization noise ratio (SQNR).

For example, numbers that can be expressed with 2 bits include 1 (01), −1 (11), and 0 (10 or 00), a maximum absolute value of which is 1. In the case of 3 bits, a range of numbers that can be expressed with the 3 bits increases to −2 through 2. In this case, because a quantization error is proportional to the number N of subcarriers in terms of the range of the signal level, an increase in the number N of subcarriers requires a large increase in the number of data bits in order to satisfy a predetermined SQNR.

However, an OFDMA terminal is allocated some of, for example, M subcarriers as an uplink. Therefore, a bitwidth (or datawidth) for the terminal using M subcarriers is represented by Equation (2) below.

$$|x[n]| \le M\max[s(k)] \qquad (2)$$

When M<N, it is possible to satisfy the SQNR required by the system even with a fewer number of bits, compared with a number of bits used for an IFFT process in the general N-point IFFT block.

Figure 2:
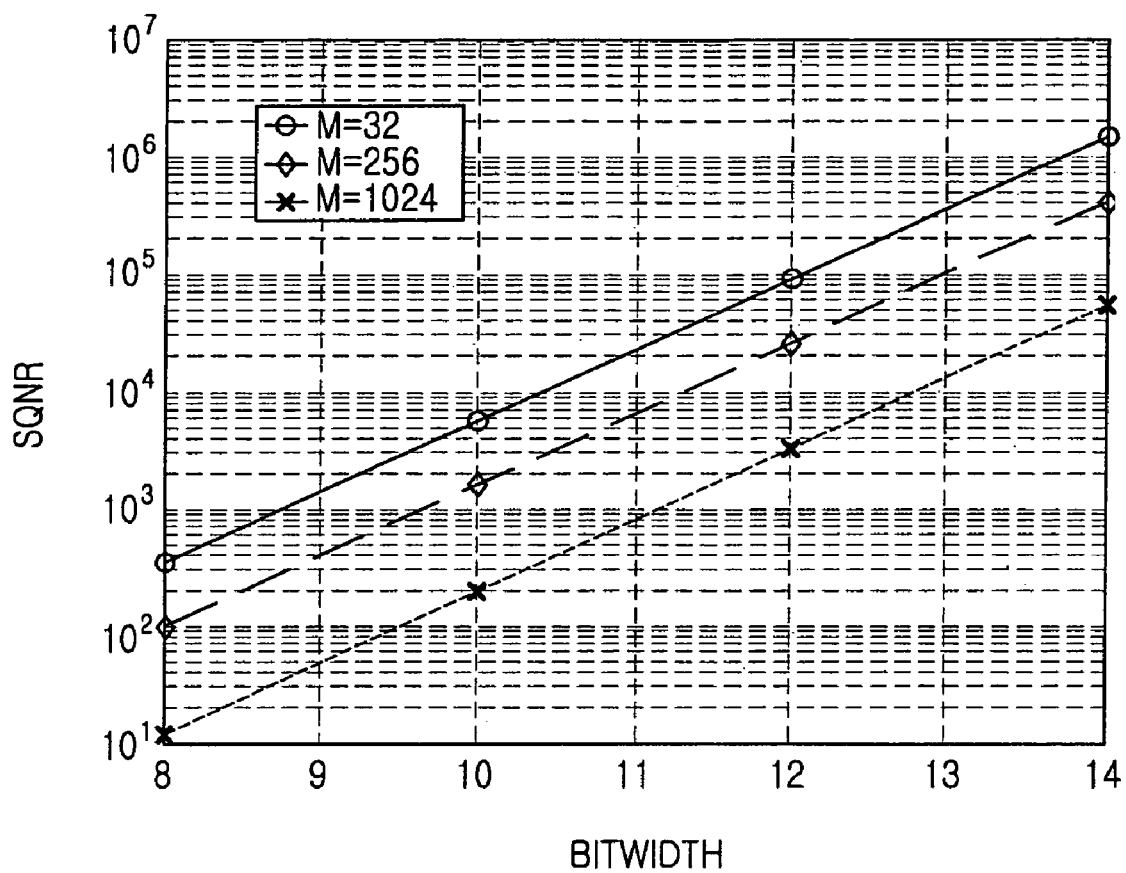
FIG. 2 is a diagram illustrating an exemplary relationship between the number M of bits and a signal-to-quantization noise ratio (SQNR) during an IFFT process at a transmitter of a terminal using M subcarriers in a general OFDMA system.

With reference to FIG. 2, a description will now be made of the number of data bits required according to the number M of subcarriers allocated to a terminal during an IFFT process in an exemplary transmitter of the terminal. FIG. 2 is a diagram illustrating a relationship between the number M of bits and the SQNR during an IFFT process at a transmitter of a terminal using M subcarriers in a general OFDMA system. Specifically, FIG. 2 is a graph illustrating simulation results.

Referring to FIG. 2, the number M of subcarriers allocated to a terminal includes 32, 256 and 1024. Assuming for example that the SQNR required by the system is 40dB, it can be noted that a bitwidth required during the IFFT process is 10 bits for M=32, 12 bits for M=256, and 13 bits for M=1024. Therefore, it is noted that when compared with M=1024, M=32 uses three less bits to maintain the same SQNR.

Generally, multiplication calculations during the IFFT process are proportional to the number of bits used. Therefore, when an IFFT block of a terminal transmitter is implemented based on the SQNR=40 dB in FIG. 2, calculation gain for M=32 can be found by Equation (3) below, and calculation gain for M=1024 can be determined by Equation (4) below.

$$\text{Calculation gain} = (\{\text{number of bits used}\}^2) = (10^2) = 100 \qquad (3)$$

$$\text{Calculation gain} = (\{\text{number of bits used}\}^2) = (13^2) = 169 \qquad (4)$$

Therefore, it can be noted that calculation gain for M=32 is 59% of calculation gain for M=1024. This can be expressed as Equation (5) below.

$$\frac{\text{calculation gain for } M = 32}{\text{calculation gain for } M = 1024} \times 100 = \frac{100}{169} \times 100 = 59.17 \qquad (5)$$

From Equation (5), it can be understood that M=32 is less than M=1024 in terms of the calculations. Therefore, it is noted that the smaller number of subcarriers requires the smaller number of bits, contributing to a reduction in calculations. Therefore, embodiments of the present invention use a number of bits required for the number of subcarriers allocated to a terminal during an IFFT process at a transmitter of the terminal, thereby using an IFFT block with the optimal calculations.

In the TTA WiBro standard, a basic transmission unit is a minimum of the number, M=18, of subcarriers in one OFDM symbol and a maximum of the number, M=864, of subcarriers. A difference between the two cases is 2.5 bits in terms of the number of bits used in an IFFT block for obtaining the same SQNR. If, for example, 12 bits are used for M=864, 9 bits are used for M=18, obtaining the same quantization error. In addition, compared with the use of 12 bits for M=864, the use of 9 bits for M=18 is 56% lower in calculations.

In this manner, embodiments of the present invention reduce calculations with use of a smaller number of data bits by varying the number of data bits used according to the number of subcarriers allocated a terminal during an IFFT process at a transmitter of the terminal, making it possible to implement IFFT at low power.

Because the number M of subcarriers allocated in the transmitter of the terminal is information predetermined according to a protocol between a terminal and a base station, a method for implementing an adaptive bitwidth IFFT block using the information will now be described with reference to FIG. 3.

Figure 3:
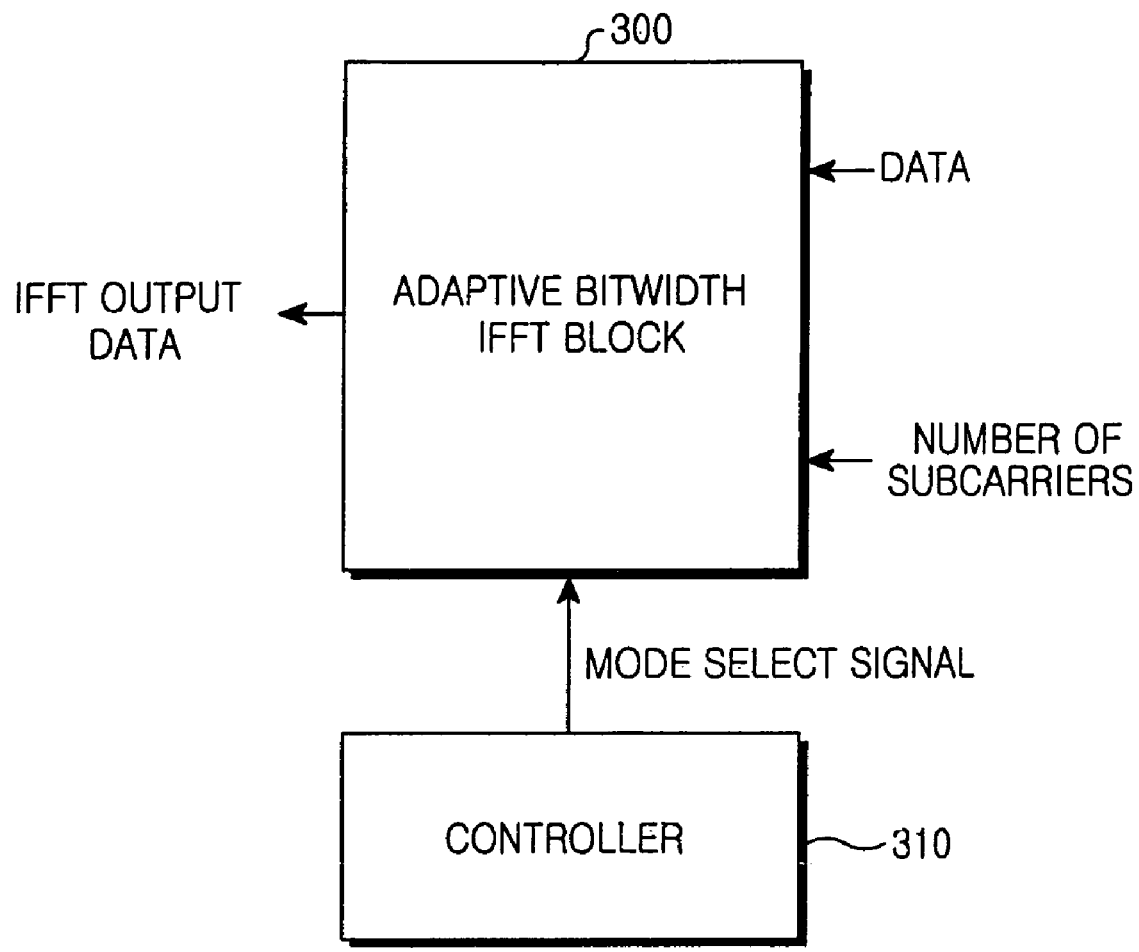
FIG. 3 is a block diagram illustrating an exemplary adaptive bitwidth IFFT block for performing an IFFT process depending on the number of subcarriers according to an embodiment of the present invention.

With reference to FIG. 3, a description will now be made of an exemplary adaptive bitwidth IFFT block 300 that performs an IFFT process using a number of data bits required according to the number M of subcarriers allocated at a transmitter of a terminal. FIG. 3 is a block diagram illustrating an adaptive bitwidth IFFT block for performing an IFFT process using an optimal bitwidth depending on the number of subcarriers according to an embodiment of the present invention.

Inputs to the adaptive bitwidth IFFT block 300 comprise transmission data, a number-of-subcarriers, and a mode selection signal. The mode selection signal, which can be a control signal output from a controller 310, indicates whether a current mode of the terminal is in a transmission mode or a reception mode. If a number-of-allocated subcarriers is received, the IFFT block 300 determines a bitwidth to be used for IFFT using the number-of-subcarriers, and then performs corresponding calculations with the determined bitwidth. The adaptive bitwidth IFFT block 300 performs IDFT and DFT for transmission. When the input mode selection signal indicates the reception mode, it uses the maximum bitwidth because all subcarriers have data of its own terminal or other terminals. However, when the mode selection signal received from the controller 310 indicates the transmission mode, the adaptive bitwidth IFFT block 300 determines a bitwidth based on the number-of-allocated subcarriers and sets all of the remaining bits except for the bits to be used, to '0'. The adaptive bitwidth IFFT block 300, as described above, adjusts the bitwidth according to the number of subcarriers.

Figure 4:
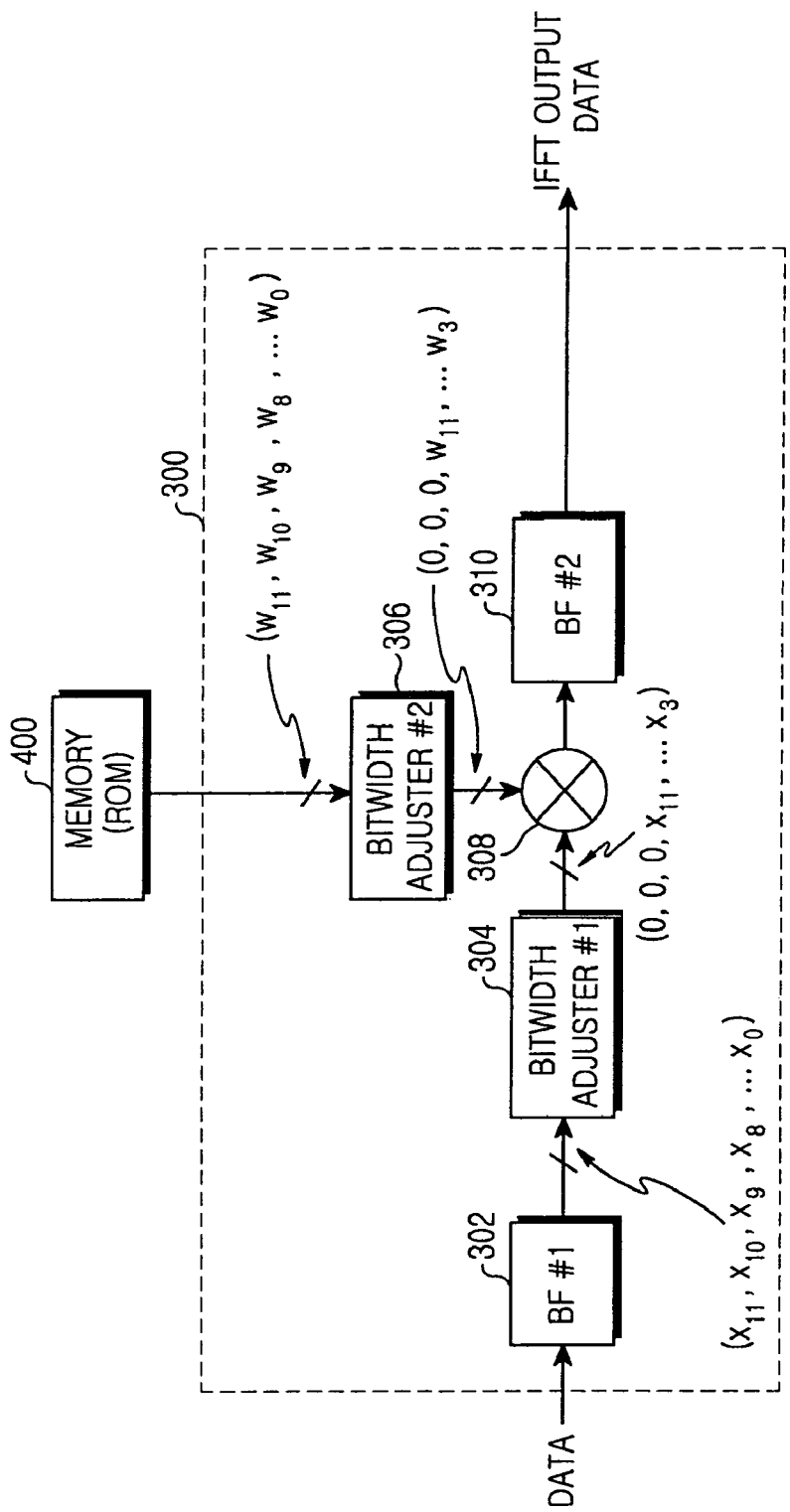
FIG. 4 is a block diagram illustrating an exemplary internal structure of an adaptive bitwidth IFFT block according to an embodiment of the present invention.

The internal structure of the adaptive bitwidth IFFT block 300 shown in FIG. 3 will now be described in more detail with reference to FIG. 4. FIG. 4 is a block diagram illustrating an exemplary internal structure of an adaptive bitwidth IFFT block 300 according to an embodiment of the present invention. The adaptive bitwidth IFFT block of FIG. 4 is implemented in the TTA WiBro by way of example. The adaptive bitwidth IFFT block 300 comprises a first and second bandpass filter 302 and 310, a first and second bitwidth adjuster 304 and 306, and a complex multiplier 308.

In order to use an optimal bitwidth during an IFFT process, the adaptive bitwidth IFFT block 300 controls the bitwidth, that is, the number of bits input to the complex multiplier 308 according to the number of subcarriers allocated to the terminal. The adaptive bitwidth IFFT block 300 is designed to support the maximum bitwidth, and {exp} values expressed with a bitwidth for obtaining a predetermined SQNR required by the system are stored therein as table values. The table values are stored in a memory, or a read only memory (ROM) 400. The memory 400 stores data with 13 bits based on the maximum M=1024, and when providing 13-bit data to a calculator due to a change in the M, it reduces the number of bits. For example, for M=32, the adaptive bitwidth IFFT block 300 right-shifts the 13-bit data stored in the memory 400 by 3 bits to remove the 3 least significant bits (LSB) having the lowest priority (or significance), creating 10-bit data, before performing calculation thereon.

If transmission data is input to the first bitwidth adjuster 304 through the first bandpass filter (BF) 302, the first bitwidth adjuster 304 adjusts the bitwidth according to the number of allocated subcarriers, and outputs the adjusted bitwidth. The first bitwidth adjuster 304 determines a bitwidth according to the number of subcarriers allocated by a controller of the terminal, and outputs a control signal for adjusting a bitwidth to the determined bitwidth to the complex multiplier 308, thereby adjusting the corresponding bitwidth. That is, the first bitwidth adjuster 304 simply removes a number of bits having low priority, and the number of bits to be removed is notified to the first bitwidth adjuster 304 by the controller of the terminal.

If, for example, an IDFT coefficient is input from the memory 400 to the second bitwidth adjuster 306, the second bitwidth adjuster 306 adjusts a bitwidth according to the number of allocated subcarriers and outputs the adjusted bitwidth. That is, the bitwidth adjusters 304 and 306 reduce their inputs to the optimal bitwidth obtained based on the number M of subcarriers used, and fill upper bits with 0.

If the data and the IDFT coefficient output from the bitwidth adjusters 304 and 306 are input to the complex multiplier 308, the complex multiplier 308 performs multiplication calculations on the inputs, and outputs the multiplication result via the second bandpass filter (BF) 310.

If the number of subcarriers changes from M=864 to M=1 8, the bitwidth adjusters 304 and 306 adjust their bitwidths according to the number of subcarriers and output the adjusted bitwidths to the complex multiplier 308. Therefore, the adaptive bitwidth IFFT block 300 changes inputs to the complex multiplier 308 according to the number of subcarriers. Describing implementation of individual multipliers in the complex multiplier 308, it is possible to optimize the amount of power used according to the allocated number-of-subcarriers M if the use of adder resources is limited by using a feedforward path for the unused higher bit part and the lower addition part on the basis of the output MSB bit.

Figure 5:
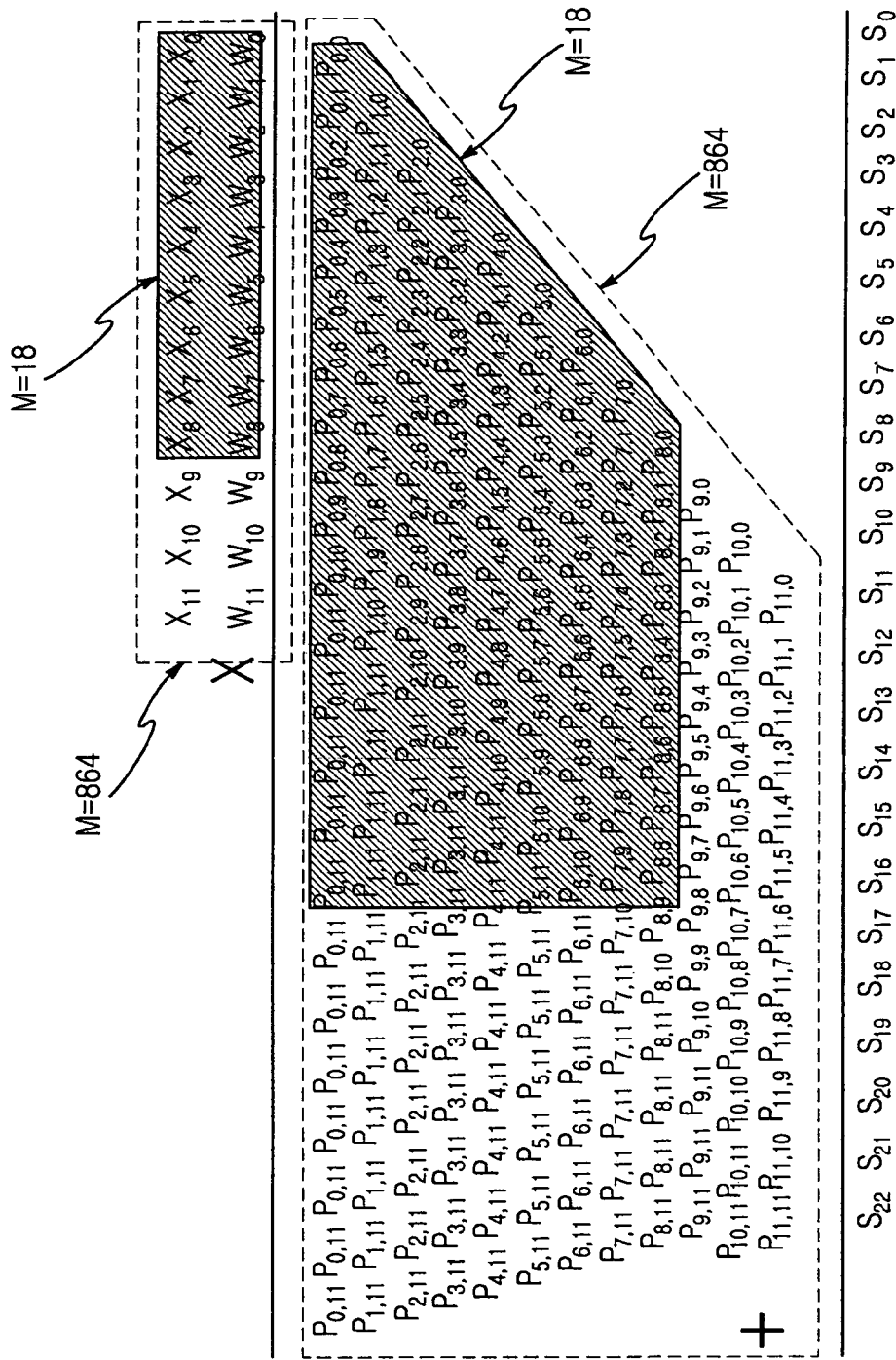
FIG. 5 is a diagram illustrating the limited use of resources necessary for multiplication calculation depending on the number of bits used based on the number of subcarriers in an exemplary adaptive bitwidth IFFT block according to an embodiment of the present invention.

It can be noted that adder resources required depending on the number-of-subcarriers M during an adaptive bitwidth IFFT process according to an embodiment of the present invention are reduced in proportion to a square of the bitwidth as shown in FIG. 5. FIG. 5 is an exemplary diagram illustrating the limited use of resources necessary for multiplication calculation depending on the number of bits used based on the number of subcarriers in an adaptive bitwidth IFFT block according to an embodiment of the present invention.

For M=864, the complex multiplier 308 performs multiplication calculations on bits $W_{11}, W_{10}, W_9, W_8, W_7, W_6, W_5, W_4, W_3, W_2, W_1, W_0$ received from the second bitwidth adjuster 306, and data bits $X_{11}, X_{10}, X_9, X_8, X_7, X_6, X_5, X_4, X_3, X_2, X_1, X_0$ received from the first bitwidth adjuster 304.

However, for M=18, the complex multiplier 308 performs multiplication calculations on bits $0, 0, 0, W_{11}, W_{10}, W_9, W_8, W_7, W_6, W_5, W_4, W_3$ received from the second bitwidth adjuster 306, and data bits $0, 0, 0, X_{11}, X_{10}, X_9, X_8, X_7, X_6, X_5, X4, X_3$ received from the first bitwidth adjuster 304.

Therefore, for M=18, the complex multiplier 308 uses only the shaded parts as its inputs or outputs. As a result, compared with M=864, M=18 has less calculations, contributing to a reduction in power consumption during the IFFT process.

Figure 6:
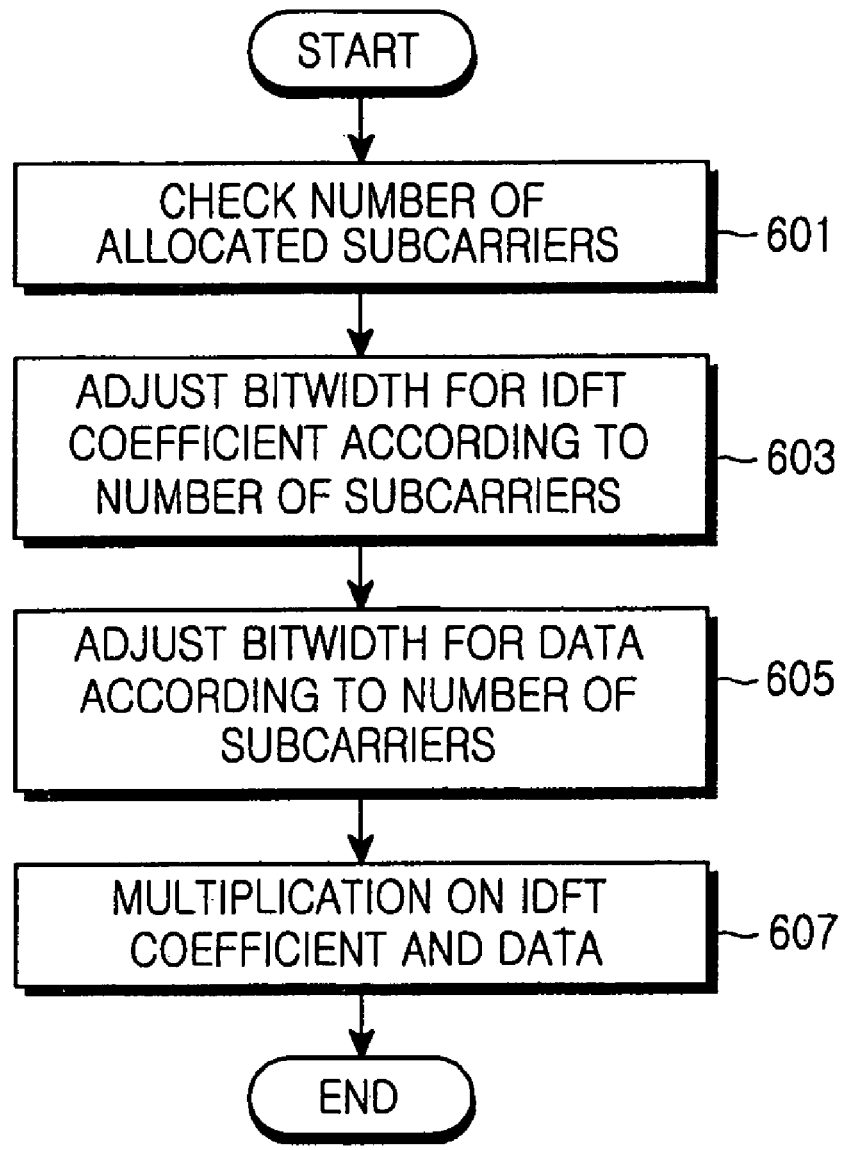
FIG. 6 is a flowchart illustrating an exemplary adaptive bitwidth IFFT process in an adaptive bitwidth IFFT block according to an embodiment of the present invention.

FIG. 6 is a flowchart illustrating an exemplary adaptive bitwidth IFFT process in an adaptive bitwidth IFFT block according to an embodiment of the present invention.

In step 601, the adaptive bitwidth IFFT block 300 checks the number of allocated subcarriers.

The second bitwidth adjuster 306 in the adaptive bitwidth IFFT block 300 adjusts a bitwidth for an IDFT coefficient according to the number of subcarriers in step 603, and the first bitwidth adjuster 304 adjusts a bitwidth for data according to the number of subcarriers in step 605. It should be noted that the order of steps 603 and 605 can be varied.

In step 607, the complex multiplier 308 performs multiplication calculations on the IDFT coefficient and the data, and outputs the multiplication results through the second bandpass filter 310.

As can be understood from the foregoing description, embodiments of the present invention allow an OFDMA system to implement a variable-bitwidth IFFT block according to the number of subcarriers allocated to a terminal. The implementation of the variable-bitwidth IFFT block enables implementation of a low-power IFFT block for use in an OFDMA transmitter.

While embodiments of the present invention have been shown and described with reference to a certain exemplary embodiments thereof, it will be understood by those skilled in the art that various changes in form and details may be made therein without departing from the spirit and scope of the invention as defined by the appended claims. For example, although embodiments of the present invention have been described with reference to an embodiment in which an IFFT block in a terminal transmitter optimally adjusts a bitwidth according to the number of allocated subcarriers before performing an IFFT process, the present invention can also be applied to alternative embodiments in which an FFT block in a terminal receiver optimally adjusts a bitwidth according to the number of allocated subcarriers before performing an FFT process.

What is claimed is:

1. An apparatus for processing a digital signal in a transmitter of an orthogonal frequency division multiple access (OFDMA) wireless communication system, the apparatus comprising:
   a memory for storing a number of allocated subcarriers and an inverse discrete Fourier transform (IDFT) coefficient;
   an inverse fast Fourier transform (IFFT) block for determining each of a bitwidth for the IDFT coefficient and a bitwidth for data according to the number of the allocated subcarriers, and performing multiplication calculations on the IDFT coefficient and the data; and
   a controller for outputting a mode selection signal indicating a transmission mode or a reception mode to the IFFT block, wherein the IDFT coefficient is defined by the following equation:

$$x[n] = \sum_{k=0}^{N-1} s(k) e^{j2\pi/Nkn} \leq \sum_{k=0}^{N-1} |s(k)||e^{j2\pi/Nkn}|$$
$$= \sum_{k=0}^{N-1} s(k) \leq N\max|s(k)|$$

wherein x[n] denotes the IDFT coefficient, n denotes an orthogonal frequency division multiplexing (OFDM) symbol index, N denotes the number of the allocated subcarriers, s(k) denotes an input signal to the IFFT block, and k denotes a subcarrier index.

2. The apparatus of claim 1, wherein the IFFT block is configured to determine the bitwidth for the IDFT coefficient according to the number of the allocated subcarriers and set all of remaining bits except for bits to be used, to '0' when the mode selection signal received from the controller indicates the transmission mode.

3. The apparatus of claim 1, wherein the IFFT block is configured to perform IFFT on all of the allocated subcarriers with a maximum bitwidth when the mode selection signal received from the controller indicates the reception mode.

4. The apparatus of claim 1, wherein the IFFT block comprises:
   a first bitwidth adjuster for determining the bitwidth for the data according to the number of the allocated subcarriers;
   a second bitwidth adjuster for determining the bitwidth for the IDFT coefficient according to the number of the allocated subcarriers; and
   a multiplier for performing multiplication calculations on the data and the IDFT coefficient output from the first and second bitwidth adjusters.

5. The apparatus of claim 4, wherein the multiplier comprises a complex multiplier.

6. An apparatus for processing a digital signal in a transmitter of an orthogonal frequency division multiple access (OFDMA) wireless communication system, the apparatus comprising:
   a memory for storing a number of allocated subcarriers and an inverse discrete Fourier transform (IDFT) coefficient;
   a first bitwidth adjuster for determining a bitwidth for data according to the number of the allocated subcarriers;
   a second bitwidth adjuster for determining a bitwidth for the IDFT coefficient according to the number of the allocated subcarriers;
   a multiplier for performing multiplication calculations on the data and the IDFT coefficient output from the first and second bitwidth adjusters; and
   a controller for outputting a mode selection signal indicating a transmission mode or a reception mode to the first bitwidth adjuster and the second bitwidth adjuster,
   wherein the IDFT coefficient is defined by the following equation:

$$x[n] = \sum_{k=0}^{N-1} s(k) e^{j2\pi/Nkn} \leq \sum_{k=0}^{N-1} |s(k)||e^{j2\pi/Nkn}|$$
$$= \sum_{k=0}^{N-1} s(k) \leq N\max|s(k)|$$

wherein x[n] denotes the IDFT coefficient, n denotes an orthogonal frequency division multiplexing (OFDM) symbol index, N denotes the number of the allocated subcarriers, s(k) denotes an input signal to an inverse fast Fourier transform (IFFT) block, and k denotes a subcarrier index.

7. The apparatus of claim 6, wherein the first bitwidth adjuster is configured to determine the bitwidth for the data according to the number of the allocated subcarriers and set all of remaining bits except for bits to be used, to '0' when the mode selection signal received from the controller indicates the transmission mode.

8. The apparatus of claim 6, wherein the second bitwidth adjuster is configured to determine the bitwidth for the IDFT coefficient according to the number of the allocated subcarriers and set all of remaining bits except for bits to be used, to '0' when the mode selection signal received from the controller indicates the transmission mode.

9. The apparatus of claim 6, wherein the first bitwidth adjuster performs transformation on all of the allocated subcarriers with a maximum bitwidth when the mode selection signal received from the controller indicates the reception mode.

10. The apparatus of claim 6, wherein the second bitwidth adjuster performs transformation on all of the allocated subcarriers with a maximum bitwidth when the mode selection signal received from the controller indicates the reception mode.

11. The apparatus of claim 6, wherein the multiplier comprises a complex multiplier.

12. A method for processing a digital signal by a transmitter in an orthogonal frequency division multiple access (OFDMA) wireless communication system, the method comprising the steps of:

checking, by the transmitter, a number of allocated subcarriers which is stored in memory;

determining, by the transmitter, a bitwidth for an inverse discrete Fourier transform (IDFT) coefficient according to the number of the allocated subcarriers;

determining, by the transmitter, a bitwidth for data and which varies number of data bits used according to the number of the allocated subcarriers during an inverse fast Fourier transform (IFFT) process at the transmitter; and performing, by the transmitter, multiplication calculations on the IDFT coefficient and the data N−1 to implement the N−1 IFFT process at low power, wherein the IDFT coefficient is defined by the following equation:

$$x[n] = \sum_{k=0}^{N-1} s(k)e^{j2\pi/Nkn} \le \sum_{k=0}^{N-1} |s(k)||e^{j2\pi/Nkn}|$$

$$= \sum_{k=0}^{N-1} s(k) \le N\max|s(k)|$$

wherein x[n] denotes the IDFT coefficient, n denotes an orthogonal frequency division multiplexing (OFDM) symbol index, N denotes the number of the allocated subcarriers, s(k) denotes an input signal to an inverse fast Fourier transform (IFFT) block, and k denotes a subcarrier index.

13. The method of claim 12, wherein the step of determining, by the transmitter, a bitwidth for an IDFT coefficient comprises the step of:

determining, by the transmitter, the bitwidth for the IDFT coefficient according to the number of the allocated subcarriers and setting all of remaining bits except for bits to be used, to '0'.

14. The method of claim 12, wherein the step of determining, by the transmitter, a bitwidth for data comprises the step of:

determining, by the transmitter, the bitwidth for the data according to the number of allocated subcarriers and setting all of remaining bits except for bits to be used, to '0'.

15. The method of claim 12, wherein the multiplication is performed using complex multiplication.

* * * * *

UNITED STATES PATENT AND TRADEMARK OFFICE
CERTIFICATE OF CORRECTION

PATENT NO. : 7,609,609 B2 Page 1 of 1
APPLICATION NO. : 11/274900
DATED : October 27, 2009
INVENTOR(S) : Song et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this

Fourteenth Day of December, 2010

David J. Kappos
*Director of the United States Patent and Trademark Office*